July 14, 1953 — C. OTTO — 2,645,560
PRODUCTION OF SULFATE OF AMMONIA
Filed March 18, 1950 — 3 Sheets-Sheet 1
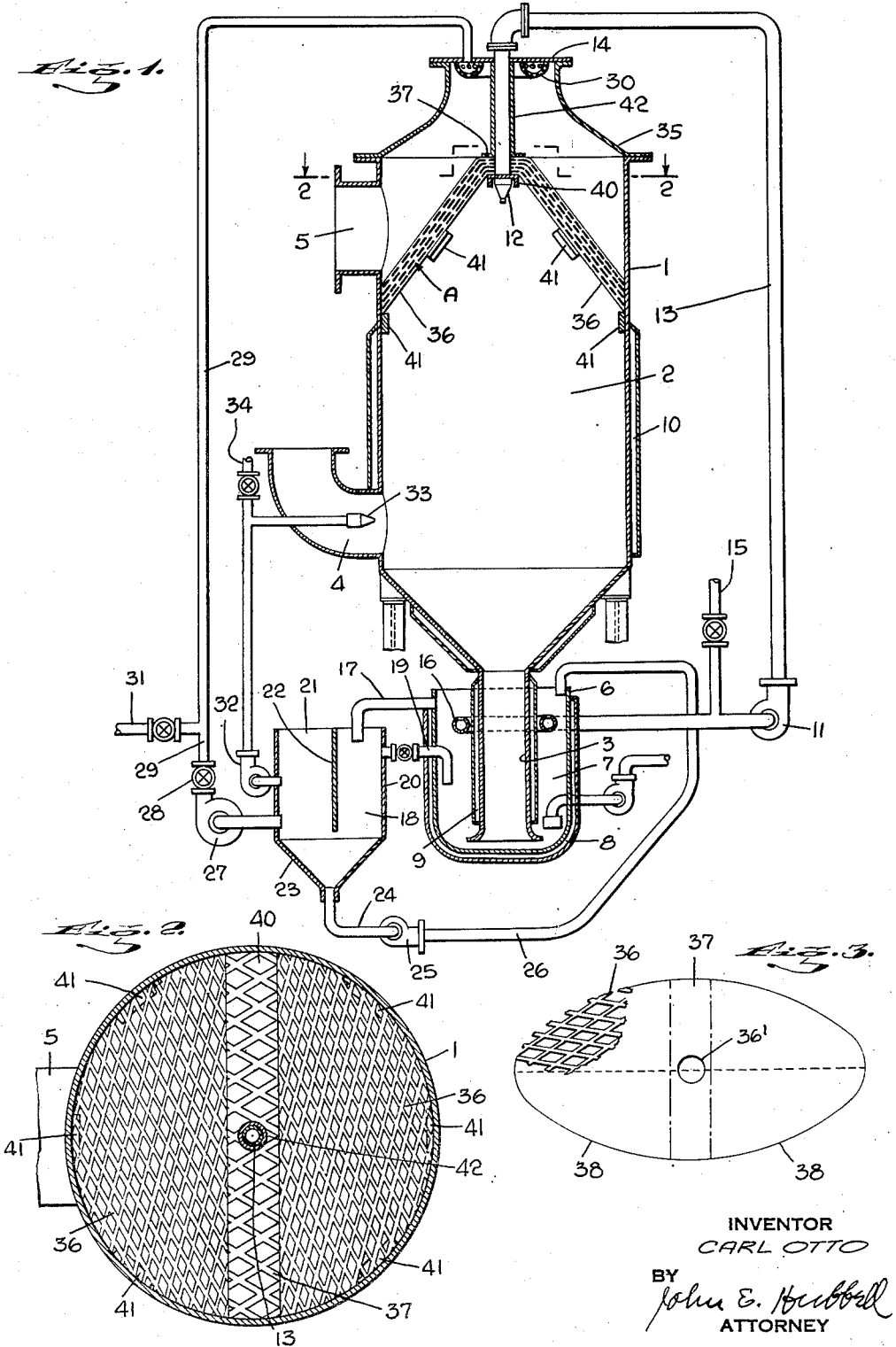
INVENTOR
CARL OTTO
BY John E. Hubbell
ATTORNEY July 14, 1953　　　　　　　C. OTTO　　　　　　2,645,560
PRODUCTION OF SULFATE OF AMMONIA
Filed March 18, 1950　　　　　　　　　　　　3 Sheets-Sheet 2
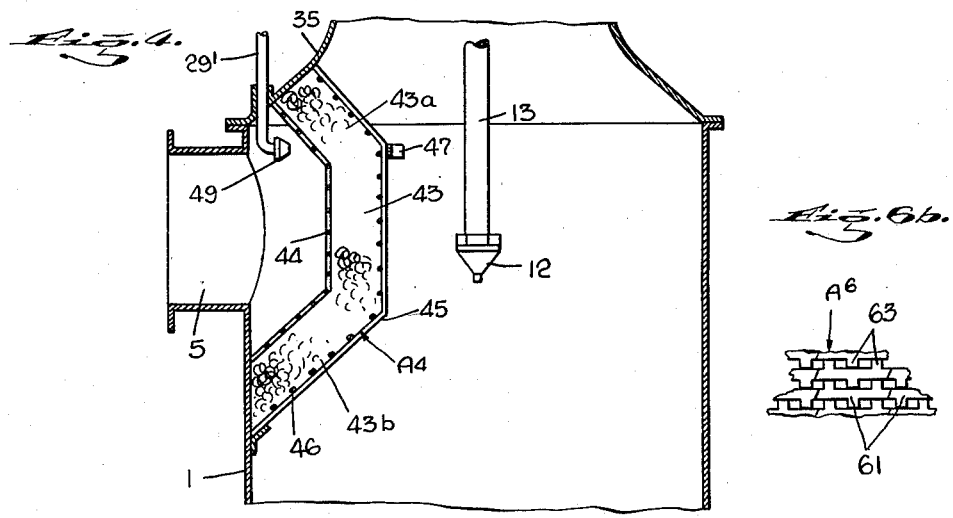
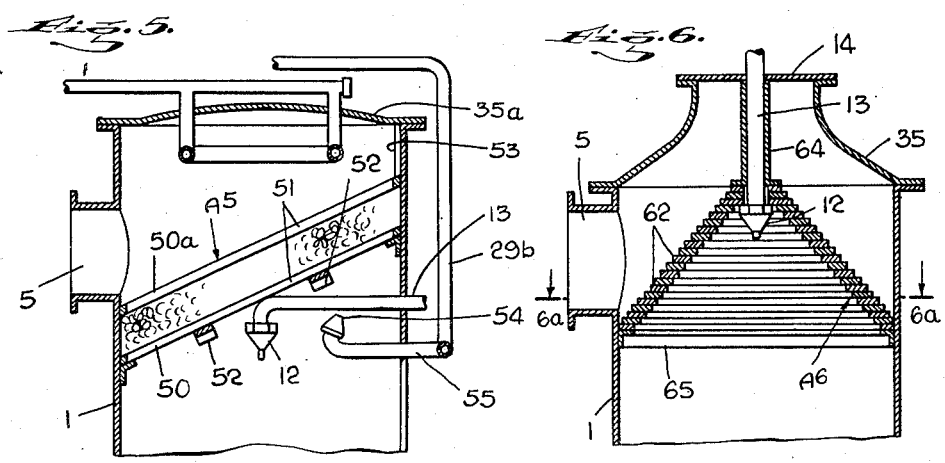
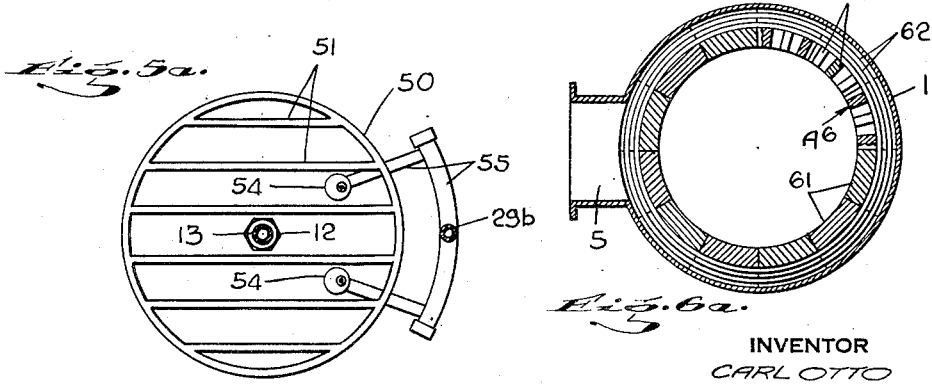
INVENTOR
CARL OTTO
BY
John E. Hubbell
ATTORNEY July 14, 1953  C. OTTO  2,645,560
PRODUCTION OF SULFATE OF AMMONIA
Filed March 18, 1950  3 Sheets-Sheet 3
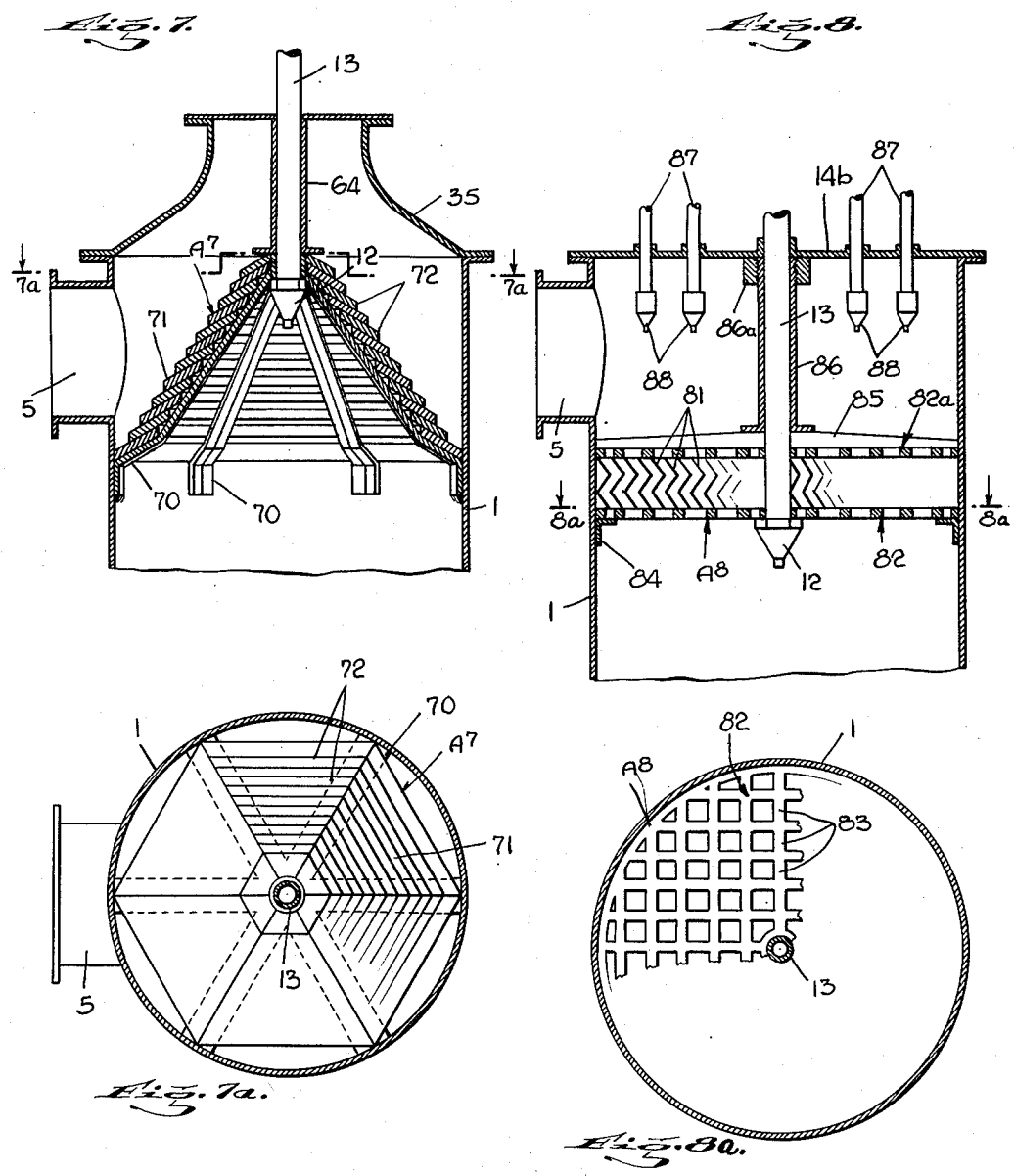
INVENTOR
CARL OTTO
BY
John E. Hubbell
ATTORNEY

Patented July 14, 1953

2,645,560

UNITED STATES PATENT OFFICE 2,645,560

PRODUCTION OF SULFATE OF AMMONIA

Carl Otto, Manhasset, N. Y.

Application March 18, 1950, Serial No. 150,410

3 Claims. (Cl. 23—119)

The present invention relates to the production of ammonia sulphate from gas, such as coke oven gas, having a small ammonia content, by spraying liquor containing ammonia sulphate and sulfuric acid into a substantially unobstructive scrubbing chamber through which the gas is continuously passed at a relatively high velocity. In the preferred practice of the present invention I make use of apparatus invented by me and disclosed in prior applications filed by me. Those applications include my application, Serial No. 720,593, filed January 7, 1947, of which this application is a continuation in part, said application having been abandoned since the instant application was filed, and in my Patent No. 2,599,067, granted June 3, 1952, on my application, Serial No. 14,902. Said patent discloses and claims various forms of spray saturators for recovery of ammonia from coke oven gas disclosed alike in said patent, said application Serial No. 720,593 and herein.

The liquid sprayed into the scrubbing chamber is preferably a saturated solution of ammonium sulphate entraining previously formed ammonium sulphate crystals. In the scrubbing chamber, the ammonium sulphate solution becomes supersaturated as a result of the absorption of ammonia from the gas. The supersaturated liquor passing downward through the scrubbing chamber is collected in a crystallizing and desupersaturating bath space. The latter may be the bottom portion of the tank enclosing the scrubbing chamber, or it may be a chamber in a separate tank into which the first mentioned tank drains. Some of the supersaturated spray liquor inevitably impinges against the inner surface of the tank wall and becomes part of a liquid film or layer on that wall. While that film tends to flow downward along the wall under the action of gravity, there is a tendency for ammonium sulphate to crystallize out of the liquor film and adhere to the wall in the form commonly known as rock salt.

Spray saturator methods of and apparatus for producing sulphate of ammonia from coke oven gas disclosed and claimed in my prior applications, are now in successful commercial use. One of the major advantages obtained in the use of such methods and apparatus, is a great reduction in the size and in the construction and operation costs of the apparatus required to recover the ammonia content of coke oven gas supplied at a given volumetric rate.

The high gas treating capacity of my spray saturators, is made possible, in large part, by the dispersion of the scrubbing liquor in the form of very fine particles in the scrubbing space, coupled with the relatively high linear velocity of the gas moving through the space. The high gas velocity and the fine subdivision of the spray liquor each tend to the entrainment of spray liquor in the gas passing out of the scrubbing chamber. Such entrainment of liquor in the gas passing away from the saturator through its gas outlet, is objectionable because the entrained liquor contains sulphuric acid. The cost of the sulphuric acid used is a major expense item in the production of sulphate of ammonia from coke oven gas and its waste is objectionable for that reason. Moreover, the entrainment of liquor in the gas leaving the saturator is objectionable because of the corrosive action of sulphuric acid on the metal piping and valves through which the gas leaving the saturator is passed.

A general object of the present invention is to provide improved means for separating entrained acid from gas passing away from the gas scrubbing chamber. Heretofore, it has been customary to separate entrained acid from the gas by passing the latter through a so called "acid catcher" external to the scrubbing tank and usually in the form of a cyclone separator.

I have discovered, and believe I was the first to realize, that it is practically feasible and advantageous to separate entrained acid from the scrubbed gas before it leaves the scrubbing tank. A primary object of the present invention is to provide a spray saturator with an effective and relatively simple and inexpensive baffle structure or screen, and supporting means therefor, between the scrubbing space therein and the gas outlet therefrom, to screen out of the gas passing through the screen the major portion of the liquor particles entrained in the gas coming into contact with the screen as it passes away from the scrubbing space and for returning the acid thus recovered into admixture within the saturator with the acidified ammonium sulphate solution collecting in or draining from the lower end of the saturator. The liquor thus arrested by the screen eventually passes down through the scrubbing chamber and out of the latter with the ammonium sulphate liquor and crystals passing away from the scrubbing chamber at the lower end of the latter.

Another important object of the present invention is the provision of simple and effective means for keeping the acid catching screen or baffle structure clean and suitably pervious.

A more specific object of the invention is to provide an acid catching screen or baffle structural arrangement which can be kept clean and effectively pervious by spraying cleaning liquid usually consisting wholly or largely of hot water onto said structure and which will pass a large portion of the cleaning liquid structure into contact with the vertical wall surrounding the scrubbing space. The hot cleaning liquid thus passed into contact with the vertical scrubbing space wall, will flow down that wall in the form of a layer or film and will mix with supersaturated spray liquor impinging against the wall, and will serve the useful purpose of diluting that liquor and preventing it from depositing ammonium sulphate on the wall in crystalline or rock salt form.

The various features of novelty which characterizes my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described preferred embodiments of the invention.

Of the drawings:

Fig. 1 is a sectional elevation of a spray saturator embodying one form of the present invention;

Fig. 2 is a plan section taken on the line 2—2 of Fig. 1;

Fig. 3 is a plan view showing a flat blank to be bent into a baffle part used in Fig. 1;

Figs. 4 and 5 are partial sectional elevations of a spray saturator each showing a different modification of the acid-catcher structure shown in Fig. 1;

Fig. 5a is an inverted plan section on the line 5—5 of Fig. 5;

Fig. 6 is a sectional elevation of a portion of a spray saturator showing a third acid-catcher modification;

Fig. 6a is a partial section on the line 6a—6a of Fig. 6;

Fig. 6b is a side elevation on an enlarged side of a portion of the acid-catcher shown in Figs. 6 and 6a;

Fig. 7 is a sectional elevation of a portion of a spray saturator showing a fourth acid-catcher modification;

Fig. 7a is a partial section on the line 7a—7a of Fig. 7;

Fig. 8 is a sectional elevation and Fig. 8a is an inverted plan of a portion of a spray saturator illustrating a fifth acid-catcher modification.

In Fig. 1, I have illustrated by way of example, an embodiment of the present invention in a spray saturator which is of a type and form disclosed in each of said prior applications, No. 720,593 and No. 14,902. The saturator shown in Fig. 1, comprises a vertically disposed tank 1 having a cylindrical body portion surrounding a scrubbing chamber 2 and having a hopper bottom and a depending coaxial liquor outlet pipe 3. The coke oven gas scrubbed in the chamber 2, enters the tank through a lateral gas inlet 4 opening into the cylindrical portion of the tank adjacent the lower end of the latter. The scrubbed gas passes away from the tank through a lateral gas outlet 5 formed in the cylindrical body portion of the tank adjacent the upper end of the tank. The pipe 3 extends down into a receptacle 6, open to the atmosphere at its upper end and having its bottom wall but slightly below the lower end of the liquor outlet pipe 3. The receptacle 6 is substantially larger in diameter than the pipe portion 3, so that the latter is surrounded by an annular chamber 7 open at its upper end and of substantial capacity.

The chamber 7, and the bore of the pipe 3 collectively form a crystallizing space in which the liquor supersaturated in the scrubbing chamber is desupersaturated, and thereby promotes the growth of crystals of ammonium sulphate crystals formed in the crystallizing space and passing into the latter with the liquor passing downward out of the scrubbing space 2. The wall of the receptacle 6 is made hollow to provide a steam jacket heating space 8 for said chamber. Similarly, the outlet pipe 3 is formed with a double wall to provide an annular steam jacket heating space 9. The body portion of the tank shell is surrounded for the major portion of its length by a steam jacket heating space 10. The purpose of said steam jacket spaces is to increase the temperature of the liquor wet walls and thereby prevent the formation of rock salt deposits on said walls.

Liquor and entrained crystals are withdrawn from the crystallizing space 7 at an upper level, by a pump 11 which passes the liquor into the scrubbing chamber 2 through a spray nozzle 12 carried by the depending outlet end portion of the pump outlet pipe 13. A depending outlet end portion of the pipe 13 passes centrally into the upper end of the chamber 2 through the top wall plate 14 of the tank 1. Make-up acid may be passed into the inlet of the pump 11 through a valved pipe 15. As shown, the inlet of the pump 11 is connected to a ring shaped trough 16 extending horizontally around the vertical pipe 3. Liquor overflows from the crystallization receptacle 6 through an overflow pipe 17 which discharged into a tar separator chamber 18. The latter is provided with a valved tar outlet 19. The tar separator chamber 18 is surrounded by the wall of a tank 20 and is separated from a clear liquor chamber 21 by a vertical tank portion 22 which does not extend to the bottom of the tank 20. The latter has a hopper bottom 23 terminating at its lower end in an outlet 24 connected to the inlet of a pump 25. The latter returns liquor to the upper end of the chamber 7 through a pipe 26.

A pump 27 drawing liquor from the clear liquor chamber 21 of the overflow tank 20 has a discharge pipe 29 with a valve 28 therein through which liquor may be passed to a spray ring 30 when the valve 28 is open. The spray ring 30 is carried at the under side of the top plate 14 of the tank 1. Alternatively, with the valve 28 closed, hot water under pressure may be passed to the spray ring 30 through a valved hot water supply pipe 31 and the portion of the pipe 29 between the valve 28 and the spray ring 30. If and when desired, the valve 28 and the valve in the hot water supply pipe 31 may be adjusted to pass a mixture of hot water and liquor to the spray ring 30. When it is desired to supply hot water only to the spray ring 30, the pump 27 may be omitted. A second pump 32 draws liquor from the clear liquor chamber 21 of the tar decanter 20 and discharges it into the lower portion of the scrubbing chamber 2 through a spray nozzle 33 mounted in the inlet 4. Hot water may also be passed to the nozzle 33 through a valved pipe 34.

The spray ring 30 discharges liquid against the upper portion of the inner wall of the tank 1 in the body of the tank 1 and of the superposed tank section 35 and against the outer surface of the portion of the pipe 13 extending downward from the under side of the top wall 14 and against the acid-catcher baffle or pervious wall A shortly to be described. The cross sectional area of the lower portion of the tank section 35 increases with the distance above the tank body, so that liquid sprayed onto the upper end portion of the inside wall of the section 35 will flow along that wall to the upper end of the inner wall of the tank body.

In accordance with the invention claimed herein, an acid-catcher A is arranged in the top of the scrubber tank to arrest and screen out of the gas passing from the scrubbing chamber 2 to the outlet 5, the major portion, at least, of the liquor entrained in the gas passing out of the scrubbing space into the acid-catcher. The latter may be formed of baffle plates or grids formed of material resistant to the corrosive action to which they will be subjected by the sulphuric acid content of the entrained liquor, such as wood, ceramic pieces in various forms including ribbed plates, the flanged parts known as "Berl saddles" and the short tubular sections or parts known as "Raschig rings," or parts of metal such as Monel metal or stainless steels not subject to attack by dilute sulphuric acid. Regardless of the baffle or grid material used, the acid-catcher is preferably so formed that a relatively large portion of the liquid sprayed onto the acid-catcher and cleaning the latter, is discharged by the acid-catcher against the adjacent wall of the scrubber tank, and is added to the liquid layer or film flowing downward along the inner side of that wall. The cleaning liquid thus added to the down flowing film on the inner side of the tank wall, decreases the sulphate percentage or content of the film, and increases the thickness of the film of the liquid therein and thus substantially reduces the tendency for sulphate crystals to deposit on and adhere to the tank wall in the form of rock salt.

The acid-catcher construction A illustrated in Figs. 1, 2 and 3 comprises superposed sheets 36 of Monel metal or stainless steel in expanded metal form of the conventional type, made by slitting and stretching actions in accordance with the disclosure of Patent 527,242 of October 9, 1904. Each expanded metal sheet 36 comprises bent portions and is substantially thicker than the flat sheet from which the expanded metal is formed. As shown, each sheet 36 is bent into the shape of an inverted V with a flattened apex portion 37. The metal sheets 36 are nested together to form the acid-catcher A shown in Figs. 1 and 2. The acid-catcher A forms a roof for the scrubbing chamber having similar steeply inclined diverging portions integrally connected by the superposed horizontal portions 37 of the different sheets which collectively form a flattened ridge-pole portion of said roof. Each acid-catcher sheet or layer 36 may be formed by a simple bending operation from a flat blank of the form shown in Fig. 3. That blank comprises similar sections 38 of an eclipse at opposite sides of and integrally connected to the horizontal central portion 37 of the blank. As will be apparent, the length of the portion 39 of the major axis of said eclipse in each section 38 increases as the angle of inclination to the horizontal of each sloping portion of the axis catcher A increases. As shown, each baffle layer 36 is formed with a central aperture 36' for the passage therethrough of the depending pipe 13 shown in Fig. 1.

The acid-catcher A of Fig. 1 may be supported in any usual or suitable manner, as by means of a horizontal beam 40 which is directly beneath the ridge-pole portion of the acid-catcher, and is welded at its ends to the tank. Alternatively, or in addition, lugs or flanged bar sections 41 welded to the tank wall may be arranged to engage and directly support the lower edge of the lowermost baffle plate 36 in the general manner indicated in Figs. 1 and 2. A sleeve 42 surrounds the pipe 13 and acts between the end wall 14 and the top of the baffle wall A to prevent any lifting of the plates 36, as a result of the increase in the gas pressure in scrubbing chamber 2 over the gas pressure above the baffle wall, which ordinarily can occur only when the normal supply of cleaning liquid through the pipe 29 and spray ring 30 is interrupted and the interstices in the baffle wall are allowed to clog up.

The spray ring 30 is preferably so formed and arranged that the major portion of the hot water or other cleaning liquid which it discharges will impinge against the upper surface of the acid catcher A. With the relatively steep inclination of the inclined wall portions of the acid catcher, much of the liquid sprayed onto the upper side of the acid catcher A will flow in film form along the various acid catcher plates 36 into engagement with the inner wall of the tank 1, and will then form part of the liquid film or layer flowing downward along the inner wall of the tank.

As previously indicated, the acid catcher may take various forms different from that shown in Figs. 1, 2 and 3, some of which are shown in Figs. 4–8.

Thus in Fig. 4, an acid catcher $A^4$ comprising a pervious baffle wall is arranged between the axis of the tank and the gas outlet 5, with its edge in engagement with an upper portion of the tank wall body and a lower portion of the tank upper end section 35, along a continuous line surrounding and displaced from the outlet opening. In the particular arrangement shown in Fig. 4, the pervious baffle wall comprises a vertical intermediate section 43 and lower and upper sections 43a and 43b. The sections 43a and 43b are reversely inclined to the vertical away from the axis of the tank 1. As shown, the sections 43 and 43a form horizontal chords extending across upper portions of the tank body, and the section 43b forms a horizontal chord extending across the lower portion of the tank section 35. Each of the sections 43, 43a, and 43b may be composed of wooden grids or acid proof tiles. As shown, the end edges of the chord like sections are held in place between separate metal flanges or ribs 44 and 45. The ribs 44 and 45 engaging the sections 43 and 43a are welded to the body of the tank wall, and the ribs 44 and 45 associated with the chord like section 43b are welded to the tank end section 35. Wooden laths, and small ceramic parts included in the baffle wall $A^4$, may be supported between the wall edges by parts 46 at each side of the wall. The latter may consist of a sheet of expanded metal, or bars 46 arranged in side-by-side vertical planes transverse to the chord like sections 43, 43a, and 43b, or by both said sheets and bars. The ends of the parts 46 adjacent the upper edge of the section 43 and the lower edge of the section 43b may be attached or supported by beams or bars 47 extending longitudinally of said sections and welded at their ends to the tank body or to the tank section 35. As shown, cleaning liquid may be sprayed against the side of the baffle wall $A^4$ through a spray nozzle 49 receiving the liquid through a branch 29' of the pipe 29.

As shown, the wall area of the acid catcher $A^4$ is substantially smaller than that of the acid catcher A, and if it is generally similar in the character of its construction to the acid catcher A, the acid catcher $A^4$ will offer substantially more resistance to gas flow through it than does the acid catcher A. As will be apparent, however, the area transverse to the direction of gas flow through each of the different acid catchers shown is several times the cross sectional area of the outlet passage 5. In consequence, each of said acid catchers may be so formed that the aggregate cross sectional area of its interstices which collectively form the gas passage through the acid catcher, is substantially greater than the cross sectional area of the gas outlet 5.

The acid-catcher $A^5$ shown in Figs. 5 and 5a is in the form of a flat pervious wall inclined to the horizontal and extending across the entire cross section of the tank 1, and comprising wooden grids or acidproof tiles. As shown, the acid-catcher $A^5$ rests on a grating 50 of Monel metal or stainless steel comprising a rim portion which when projected on a horizontal plane as shown in Fig. 5a appears to be circular but which is actually elliptical and comprising parallel side-by-side bars 51 having their ends integrally connected to the rim portion of the grating. Advantageously, and as shown, the bars 51 are inclined to the horizontal at the same angle as the baffle wall $A^5$. The rim of the grating 50 rests on lugs 52 welded to the wall of the tank 1. As shown, a grating 50a, which may be similar to the grid 50 rests on top of the baffle wall $A^5$. To prevent laths or tile forming the wall $A^5$ from lifting under adverse operating conditions, a strut 53 is interposed between the upper portion of the rim of the grating 50a, and the removable upper tank head 35a of the tank 1, which is secured to the upper end of the tank body. When the head 35a is removed, the wall $A^5$ may be removed for cleaning or repairs and to give access to the subjacent spray nozzles.

If the acid-catcher $A^5$ shown in Fig. 5 is formed of superposed sheets of expanded Monel metal or stainless steel, as it may be, each sheet will be of elliptical shape. In the arrangement shown in Fig. 5, the downwardly directed upper liquor spray nozzle 12 is located centrally in the tank 1, and may be connected to a vertical branch of the pipe 13 extending down through the tank top wall 35a and baffle wall $A^5$. As shown, however, the nozzle 12 is supplied with spray liquor through a portion of the pipe 13 which extends into the tank through the vertical wall of the latter.

With the arrangement shown in Figs. 5 and 5a, most of the cleaning liquid sprayed onto the upper side of the baffle wall $A^5$ and draining along and through the latter, passes into contact with the portion of the tank wall adjacent the lower portion of said baffle wall. However, the amount of cleaning liquid reaching the tank wall at the opposite side of the tank from the outlet 5 may be suitably increased by spraying jets of hot water cleaning liquid against the under side of the upper portion of baffle wall $A^5$ and the subjacent portion of the tank wall through one or more spray nozzles 54, supplied with liquid through piping 55 connected to the pipe 29.

In Figs. 6, 6a and 6b, I have illustrated an acid catcher $A^6$ comprising a pervious wall of conical form which has the advantage of uniformly distributing about the axis of the tank 1, the liquid in film form which it passes to the tank wall. The conical wall of the acid catcher $A^6$ may be formed and supported in various ways. In particular, it may be built up as the conical roof portions of furnaces and cisterns sometimes are of plate like parts 61 preferably perforated and arranged in successive courses 62 at successively higher levels and of successively smaller diameter. The plate like parts 61 may have their ends oppositely beveled and be formed with transverse ribs 63 to space the parts in different courses away from one another. The parts 61 may be formed of wood, or of acid resistant ceramic material, or of metal. The latter may be in expanded form or may be in the form of ribbed plates which are preferably perforated. A tubular strut 64 surrounding the depending section of the pipe 13 and acting between the top plate 14 and the top of the conical wall $A^6$. The lower course 62 of parts 61 is supported by a circular flange or rib 65 welded to the tank wall.

In Figs. 7 and 7a, I have illustrated an acid catcher $A^7$ in the form of a pyramid comprising inclined rafters or beam parts 70 which may be made of expanded Monel metal or stainless steel, and are located at the corner edges of the pyramid, and on which sections 71 of expanded Monel metal or ribbed ceramic plates, arranged as shown in Figs. 7 and 7a, may be arranged of superposed courses 72. Each upper course in Fig. 7 overlaps the immediately subjacent course, as is the case in Figs. 6 and 6a also.

In Figs. 8 and 8a, I have illustrated a modification of the apparatus shown in Fig. 1 in which the acid catcher baffle wall $A^8$ is horizontal and comprises a multiplicity of bent plates 81 arranged side-by-side to provide a plurality of zigzag passages leading from the bottom to the top of the baffle wall. The plates 81 rest on a lower grating 82 comprising a circular rim portion and integrally connected across bar portions 83. The rim portion of the grating is supported on a circular flange 84 welded to the inner wall of the tank body 1. A grating 82a rests on top of the baffle wall $A^8$ and is pressed against the baffle wall by a beam 85 and a vertical tubular strut 86 which surrounds the pipe 13 supplying spray liquor to the spray nozzle 12. The lower end of said strut engages the beam 85, while its upper end is externally threaded and is surrounded by a nut 86a which abuts against the lower side of the upper end head 14b of the tank. A plurality of hot water supply pipes 87 extend down through the tank top plate 14b and carry spray nozzles 88 at their lower ends. The pipe 13 extends far enough down into the tank to permit the horizontal baffle wall $A^8$ to be below the level of the under side of the gas outlet 5. The plates 81, gratings 82, and associated parts for securing the baffle wall $A^8$ in place may all be formed of Monel metal or acid resistant stainless steel. The plates 81 may be impervious in some cases, but advantageously are formed of expanded metal, and are of the character of the pervious masses or hurdles employed in a so called hurdle washer of the type shown in the Biemann et al. patent, 2,003,271, of May 28, 1935.

The baffle wall construction shown in Figs. 8 and 8a form a simple and effective arrangement for screening entrained acid out of the gas passing from the scrubbing chamber to the gas outlet, but lacks the capacity for passing a relatively large portion of the cleaning liquid sprayed onto it to the surrounding tank wall.

The plates of Monel metal or stainless steel included in the various pervious baffle walls illustrated arrangements and hereinbefore described, may well have a thickness of from 1/8" to 1/4". In each of the forms of construction shown, the baffle wall is readily removable when necessary or desirable for cleaning, inspection, repairs, or to permit access to the scrubbing space beneath the wall.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. An apparatus for scrubbing ammonia out of coke oven gas with scrubbing liquid consisting mainly of ammonium sulphate solution containing ammonium sulphate crystals having a sulphuric acid content, comprising an elongated vertical scrubbing structure having an inlet gas conduit in the lower portion of said structure whereby gas in introduced above the liquid level and having an upper gas discharge conduit, said structure opening into a crystallizing chamber below said structure, said crystallizing chamber having an upper liquid conduit discharging through a spray nozzle into the upper portion of said structure, a conduit in the lower portion of said crystallizer for removing crystals, a tar separator near said crystallizer and a conduit from the upper portion of said crystallizer to the upper portion of said tar separator, a conduit from said tar separator to the upper part of said chamber above said spray nozzle, and a baffle in the upper portion of said chamber opposite the gas outlet conduit and between the spray nozzle and the conduit opening from the separator.

2. In removing ammonia from a stream of coke oven gas flowing upwardly through a substantially unobstructed scrubbing space in a scrubber which encloses said space and has a lower gas inlet above the liquid level and an upper gas outlet from said space, the method which consists in spraying ammonium sulphate solution with entrained crystals containing sulphuric acid into the ammonia containing gas in said scrubber space so that the gas only encounters spray of ammonium sulphate solution, separating said entrained solution by passing the gas through a baffle after it is passed through the solution spray, said baffle being washed by hot water and ammonium sulphate solution, allowing the solution to descend after contact with the gas into a crystallizing bottom portion of said space, withdrawing solution containing fine crystals from the upper part of said crystallizing space portion, adding sulphuric acid thereto and returning said solution to the scrubbing space as said spray.

3. In removing ammonia from a stream of coke oven gas flowing upwardly through a substantially unobstructed scrubbing space in a scrubber which encloses said space and has a lower gas inlet and an upper gas outlet from said space, the method which consists in spraying ammonium sulphate solution with entrained crystals containing sulphuric acid into the ammonia containing gas in said scrubber space so that the gas only encounters spray of ammonium sulphate solution, separating said entrained solution by passing the gas through a baffle after it is passed through the solution spray, allowing the solution to descend after contact with the gas into the bottom of a crystallizing space, withdrawing crystals from the bottom of said space, circulating the solution containing fine crystals through a tar separator and returning said separated solution back to the crystallizing space, wihdrawing solution containing fine crystals from the upper part of said crystallizing space, adding sulphuric acid thereto and returning said solution to the scrubbing space as said spray.

CARL OTTO.

References Cited in the file of this patent
UNITED STATES PATENTS

| Number | Name | Date |
| --- | --- | --- |
| 824,092 | Brunck | June 26, 1906 |
| 1,673,732 | Brooks | June 12, 1928 |
| 1,713,045 | Jacobson | May 14, 1929 |
| 1,866,443 | Zumbro | July 5, 1932 |
| 2,354,675 | Fisher | Aug. 1, 1944 |
| 2,375,922 | Jeremiassen | May 15, 1945 |
| 2,482,643 | Tiddy | Sept. 20, 1949 |